No. 748,051. PATENTED DEC. 29, 1903.
E. T. CURRAN.
NON-REFILLABLE BOTTLE.
APPLICATION FILED MAY 28, 1903.
NO MODEL. 2 SHEETS—SHEET 1.
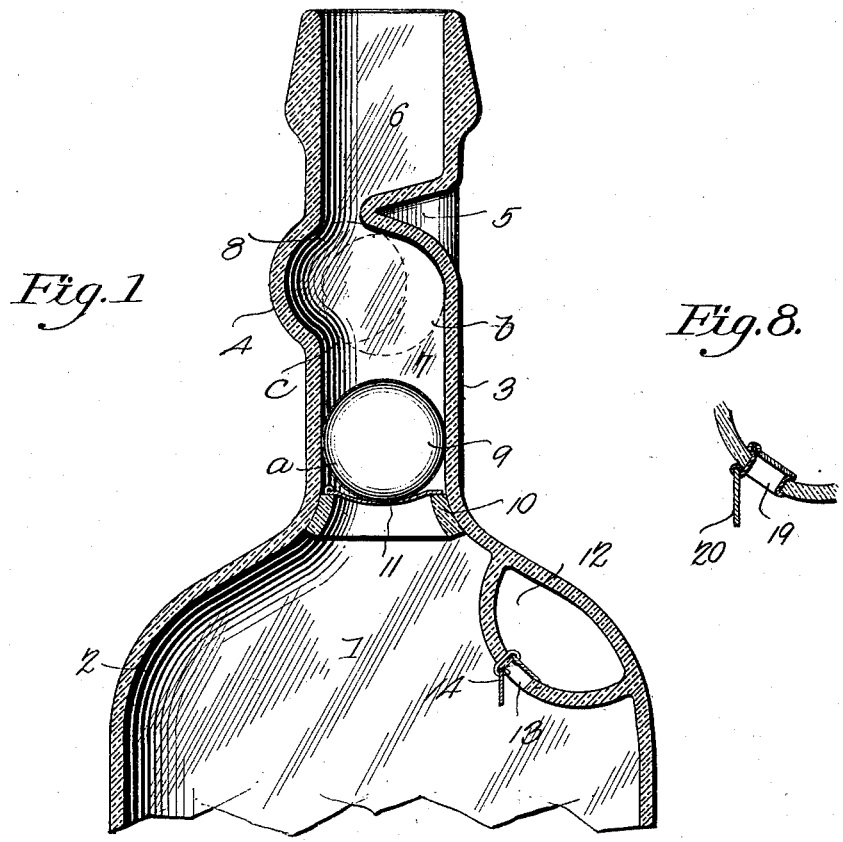
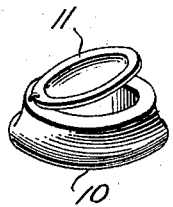
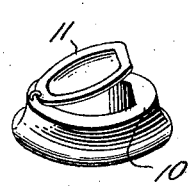
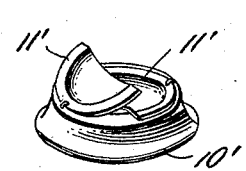
Witnesses
Edward T. Curran, Inventor,
by C. A. Snow & Co.
Attorneys No. 748,051. PATENTED DEC. 29, 1903.
E. T. CURRAN.
NON-REFILLABLE BOTTLE.
APPLICATION FILED MAY 28, 1903.
NO MODEL. 2 SHEETS—SHEET 2.
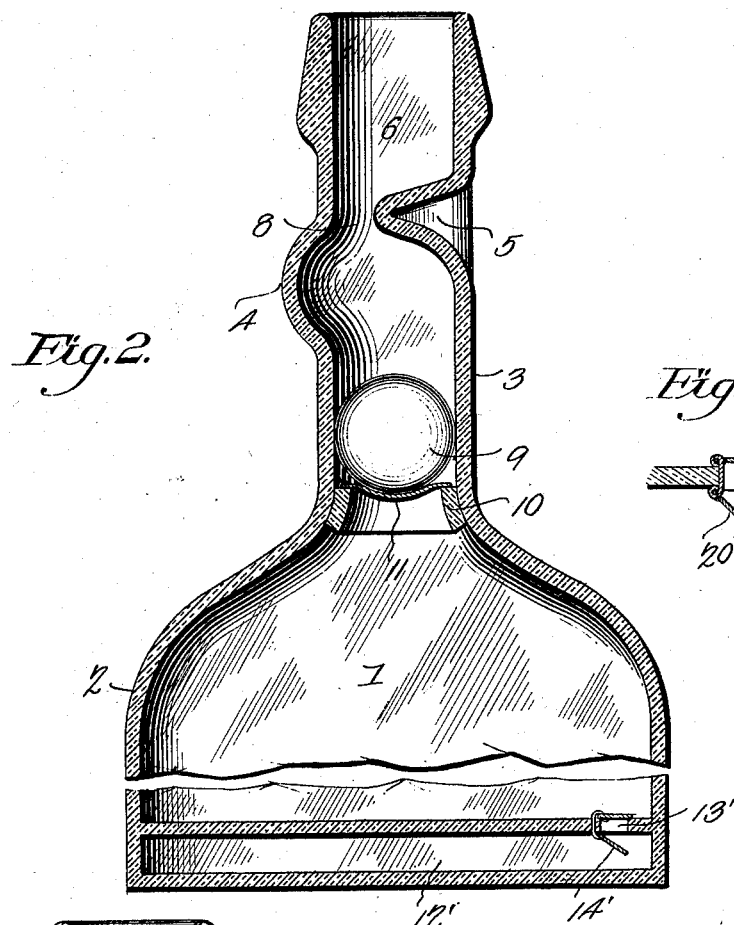
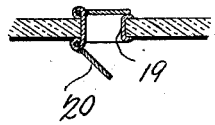
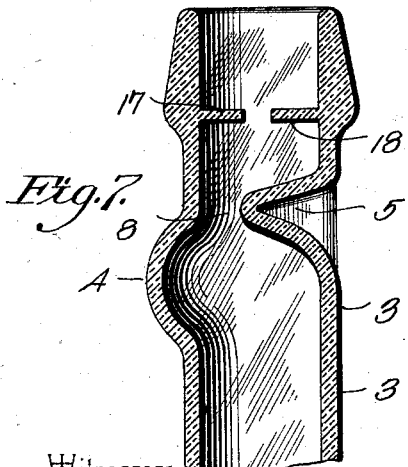
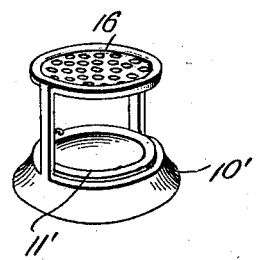
Edward T. Curran, Inventor,
by C. A. Snow & Co.
Attorneys No. 748,051.                                    Patented December 29, 1903.

UNITED STATES PATENT OFFICE.

EDWARD T. CURRAN, OF NEW YORK, N. Y.

NON-REFILLABLE BOTTLE.

SPECIFICATION forming part of Letters Patent No. 748,051, dated December 29, 1903.

Application filed May 28, 1903. Serial No. 159,178. (No model.)

*To all whom it may concern:*

Be it known that I, EDWARD T. CURRAN, a citizen of the United States, residing at New York, in the county of New York and State of New York, have invented a new and useful Improvement in Non-Refillable Bottles, of which the following is a specification.

My invention relates to non-refillable bottles, and has for its objects to produce a device of this character of comparatively simple construction which will be efficient in operation, one which will prevent the fraudulent refilling of the bottle under ordinary conditions, and one in which when the bottle is once emptied of its contents successful refilling of the same will be indicated.

To these ends the invention comprises the novel details of construction and combination of parts more fully hereinafter described.
In the accompanying drawings, Figure 1 is a vertical longitudinal section through a bottle embodying my invention in its preferred form. Fig. 2 is a similar view of a modification. Fig. 3 is a detail perspective view of the flap-valve. Figs. 4, 5, and 6 are similar views of modifications of the same. Fig. 7 is a vertical longitudinal section of a bottleneck provided with cork-supporting members. Figs. 8 and 9 are detail views illustrating a modified form of valve for controlling entrance to the indicating-chamber.

Referring to the drawings, 1 indicates a bottle composed, preferably, of glass and comprising a body 2 and an integral neck 3, which latter has its side wall adjacent to its longitudinal center bulged outward upon one side, as at 4, and indented, as at 5, at a point opposite the upper edge of the bulge, thus forming in the neck an upper cork-receiving chamber 6 and a lower valve-receiving chamber 7, communicating with the upper chamber by means of a reduced tortuous discharge-opening 8, the lower chamber 7 having disposed therein a freely-movable spherical valve 9, the purpose of which will presently appear.

10 is a circumferential ledge or shoulder upon the interior of the neck, preferably at its point of juncture with the body, said ledge consisting of a removable ring of glass or the like maintained in position by frictional engagement or by the use of cement. Pivoted to one side of the ring 10 at its normally upper edge is a flap-valve 11, composed of any suitable material and adapted to normally seat upon the ledge to prevent entrance of liquid to the bottle and to swing outward upon its pivot to permit free discharge of the liquid. This valve is by preference of concavo-convex form in cross-section and disposed with its concaved side uppermost to conform to the spherical valve 9, which normally rests thereon, as indicated by free lines at *a* in Fig. 1. With the parts in this position the weight of the ball 9 upon the valve 11 presses the same firmly upon its seat and entirely precludes the introduction of liquid to the bottle through its neck, as will be readily understood. When, however, the bottle is tilted in the proper direction, the ball 9 will move to and occupy the position indicated by dotted lines at *b* in Fig. 1, thus permitting the liquid to flow freely over the same and outward through the reduced opening 8. If, however, the bottle be tilted in the wrong direction in an attempt to discharge its contents, the ball will move to the position indicated by dotted lines at *c* in Fig. 1 to close the opening 8 and prevent escape of liquid from the bottle. Thus it will be seen that in order to discharge the contents of the bottle the same must be tilted in a certain direction, which will bring a predetermined point of its side wall downward for the purpose now to be explained.

Formed within the body 2 of the bottle upon the side which will occupy the lowermost position in discharging the bottle's contents and at a point just below the juncture of the body and neck is a chamber or receptacle 12, which communicates with the interior of the bottle through the means of an aperture 13, provided with a double-flap valve 14, having one of its flaps disposed within the chamber and its other flap disposed externally thereof, whereby the valve may close said aperture from either direction. In practice the valve 14 will be oscillated, owing to the natural jarring attendant upon manipulating the bottle to discharge its contents, and this oscillating of the valve will permit a portion of the liquid which when the bottle is held in proper discharging position must flow over the wall of the chamber 12 to pass through the aperture 13 into the chamber, whereby the chamber 12 will gradually fill with liquid as the contents of the bottle are from time to time discharged, so that by the time the bottle's contents have been fully discharged the chamber 12 will have become filled with the liquid, which is prevented from escaping owing to its pressure upon the inner flap of valve 14. Thus it will be readily apparent that the state or condition of chamber 12 will indicate whether or not the original contents of the bottle have been discharged or partially discharged and will disclose whether or not the bottle has been fraudulently refilled or partially refilled. For example, should the chamber 12 appear full of liquid and the bottle but half full it would indicate that the bottle had been half refilled, or should the chamber 12 appear but half full and the bottle full it would indicate that but half of the original contents of the bottle had been discharged and that the liquid had then been added to fill the bottle..

In Fig. 2 is shown a modification in which the valves controlling the neck of the bottle are identical in construction and operation with those above described, but in which the indicating-chamber 12', corresponding with the chamber 12, is disposed at the bottom of the bottle and has in its upper wall an aperture 13' controlled by a double-flap valve 14' identical in construction and operation with the valve 14, the difference in operation residing in the fact that the valve will be oscillated owing to the lifting and setting down of the bottle to permit gradual filling of the chamber 12' for the purpose above explained.

In Fig. 4 I have illustrated a slight modification of the flap-valve, in which the ring 10' is enlarged transversely at one side, as at 15, and the valve hinged at a point diametrically opposite this enlargement, whereby the enlargement will form a firm seat for the valve at the point directly opposite its pivot.

In Fig. 5 there is disclosed another modification of the valve, in which two flaps 11' 11' are pivoted to the ring 10' at diametrically opposite points and are adapted when closed to overlap at their meeting edges, these flaps being semicircular in plan.

In Fig. 6 I have shown the ring 10' as provided above the flap-valve 11' with a perforated shield 16, which may be of concavo-convex form in cross-section and disposed with its concavity upward to receive the ball-valve 9 when the parts are assembled in operative position. This shield serves to prevent the ready introduction of an instrument for tampering with the underlying valve and at the same time permits ready discharge of the liquid.

In Fig. 7 I have shown the bottle-neck 3 as provided in its upper chamber with cork-sustaining members 17 18 in the form of horizontal inwardly-projecting radial fingers, upon which the lower end of the cork rests when in position in the bottle-neck, these fingers serving to prevent the cork from being pressed downward in the neck, as sometimes occurs in practice owing to the cork breaking during the operation of withdrawing it. Thus interference with the underlying valve by the cork is obviated, and the member 17, which projects outward from the wall of the neck a distance sufficient to entirely overlie the upper end of opening 8, to a large extent prevents introduction of an instrument through said opening for tampering with the underlying valve.

In Figs. 8 and 9 is illustrated a modified form of valve for controlling admission of liquid to chamber 12 or 12', in which 19 is a short tubular member or eyelet of any suitable metal, to each end of which is pivoted a flap-valve 20, one opening inward and the other outward. The parts are assembled by attaching one flap to the eyelet, inserting it through the aperture in the wall of the chamber, securing the eyelet in place, and then attaching the other flap. In practice the operation of these valves will be substantially as that above described, the valves 20 swinging open when the bottle is tilted, thus admitting entrance of liquor to the chamber, and the inner valve closing permanently when the chamber is full of liquor, owing to pressure of the latter on the valve to prevent escape of the liquor.

In practice the parts will be assembled by turning the bottle bottom up and dropping the ball 9 into its neck, then inserting the ring 10, carrying the flap-valve, and filling the bottle through an opening in its bottom, said opening being permanently closed in any of a variety of methods which are well known in glass manufacturing. The chamber 12 is of course by preference formed upon the interior of the bottle during the course of manufacturing the same. With the form of bottle shown in Fig. 2 the same may be filled through an opening in its side near its bottom, or after the valves have been assembled in its neck and the bottle filled the chamber 12' may be applied thereto as a closure for the bottom.

From the foregoing it will be seen that I produce a device which is comparatively simple of construction and one which will prevent refilling of the bottle under ordinary circumstances or indicate such refilling should it be accomplished. In attaining these ends I do not limit myself to the precise details herein shown and described, inasmuch as minor changes may be made therein without departing from the spirit or scope of my invention.

Having thus described my invention, what I claim is—

1. In a non-refillable bottle, the combination with a bottle and its neck, of a chamber disposed in the bottle and having an aperture, and a valve controlling the aperture and operable for permitting gradual filling of the chamber.

2. In a non-refillable bottle, the combination with a bottle and its neck, of valve mechanism disposed in the neck and permitting discharge when the bottle is tilted in one direction only, a chamber disposed in the bottle in the path of the outflowing liquor, and means operable for permitting gradual filling of the chamber during discharge of the liquor.

3. In a non-refillable bottle, the combination with a bottle and its neck, of valve mechanism disposed in the neck and permitting discharge when the bottle is tilted in one direction only, a chamber disposed in the bottle in the path of the outflowing liquor and provided with an aperture, and a valve controlling the aperture and operable for permitting gradual filling of the chamber.

4. In a non-refillable bottle, the combination with a bottle and its neck, of a valve disposed in the neck, said neck having a reduced discharge-opening at a point above the valve, a ball disposed in the neck above the valve and operable for controlling discharge through the reduced opening, a chamber disposed in the bottle in the path of the outflowing liquor, and means operable for permitting gradual filling of the chamber during discharge of the liquor.

In testimony that I claim the foregoing as my own I have hereto affixed my signature in the presence of two witnesses.

EDWARD T. CURRAN.

Witnesses:
J. H. JOCHUM, Jr.,
J. ROSS COLHOUN.